United States Patent
Rohani et al.

(10) Patent No.: US 10,353,053 B2
(45) Date of Patent: Jul. 16, 2019

(54) OBJECT DETECTION USING RADAR AND MACHINE LEARNING

(71) Applicants: Mohsen Rohani, Gatineau (CA); Song Zhang, Ottawa (CA); Hao Chen, Ottawa (CA)

(72) Inventors: Mohsen Rohani, Gatineau (CA); Song Zhang, Ottawa (CA); Hao Chen, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 279 days.

(21) Appl. No.: 15/262,947

(22) Filed: Sep. 12, 2016

(65) Prior Publication Data

US 2017/0307735 A1    Oct. 26, 2017

Related U.S. Application Data

(60) Provisional application No. 62/326,564, filed on Apr. 22, 2016.

(51) Int. Cl.
  *G01S 7/41* (2006.01)
  *G01S 13/86* (2006.01)
  (Continued)

(52) U.S. Cl.
  CPC .......... *G01S 7/417* (2013.01); *G01S 13/865* (2013.01); *G01S 13/867* (2013.01); *G01S 13/89* (2013.01); *G01S 17/89* (2013.01); *G06N 20/00* (2019.01)

(58) Field of Classification Search
  CPC ........ G01S 7/417; G01S 13/86; G01S 13/865; G01S 13/867; G01S 13/931
  See application file for complete search history.

(56) References Cited

U.S. PATENT DOCUMENTS

| | | | |
|---|---|---|---|
| 8,195,394 B1* | 6/2012 | Zhu | G01C 21/26 382/107 |
| 8,542,106 B2* | 9/2013 | Hilsebecher | G01S 7/412 340/435 |

(Continued)

FOREIGN PATENT DOCUMENTS

| | | |
|---|---|---|
| CN | 101189533 A | 5/2008 |
| CN | 103576154 A | 2/2014 |

(Continued)

OTHER PUBLICATIONS

Werber, Klaudius et al, Automotive Radar Gridmap Representations (2015). 2015 IEEE MTT-S International Conference on Microwaves for Intelligent Mobility, Heidelberg: (IEEE) Institute of Electrical and Electronics Engineers.

(Continued)

*Primary Examiner* — Peter M Bythrow (57) ABSTRACT

A method and system for using one or more radar systems for object detection based on machine learning in an environment is disclosed. A scanning radar or combination of radars mounted on a vehicle or moving object scans the environment to acquire information. The radar data may be a 3D point cloud, 2D radar image or 3D radar image. The radar data may also be combined with data from LIDAR, vision or both. A machine learning algorithm is then applied to the acquired data to detect dynamic or static objects within the environment, and identify at least one object feature comprising one of a type, location, distance, orientation, size or speed of an object.

20 Claims, 3 Drawing Sheets

(51) Int. Cl.
  *G01S 13/89* (2006.01)
  *G01S 17/89* (2006.01)
  *G06N 20/00* (2019.01)

(56) References Cited

U.S. PATENT DOCUMENTS

| | | | | |
|---|---|---|---|---|
| 9,037,393 | B2* | 5/2015 | Kim | G01S 17/936 |
| | | | | 701/301 |
| 9,097,800 | B1* | 8/2015 | Zhu | G01S 13/865 |
| 9,201,421 | B1* | 12/2015 | Fairfield | B60W 40/04 |
| 9,429,650 | B2* | 8/2016 | Zeng | G01S 13/867 |
| 9,489,635 | B1* | 11/2016 | Zhu | G06N 99/005 |
| 9,720,415 | B2* | 8/2017 | Levinson | G01S 17/42 |
| 2003/0154010 | A1* | 8/2003 | Rao | B60R 21/013 |
| | | | | 701/45 |
| 2006/0125680 | A1* | 6/2006 | Thackray | G01S 7/41 |
| | | | | 342/54 |
| 2006/0140449 | A1* | 6/2006 | Otsuka | G06K 9/3241 |
| | | | | 382/104 |
| 2010/0191391 | A1* | 7/2010 | Zeng | G01S 13/723 |
| | | | | 701/1 |
| 2013/0253796 | A1* | 9/2013 | Luo | G08G 1/166 |
| | | | | 701/96 |
| 2014/0333468 | A1* | 11/2014 | Zhu | G01S 17/95 |
| | | | | 342/54 |
| 2015/0266455 | A1* | 9/2015 | Wilson | G09B 19/10 |
| | | | | 701/93 |
| 2017/0010348 | A1* | 1/2017 | Noonan | G01S 17/66 |
| 2017/0160744 | A1* | 6/2017 | Chia | G05D 1/0088 |
| 2017/0254895 | A1* | 9/2017 | Tong | G01S 13/878 |
| 2017/0336504 | A1* | 11/2017 | Kai | G01S 13/931 |

FOREIGN PATENT DOCUMENTS

| | | |
|---|---|---|
| CN | 104252630 A | 12/2014 |
| CN | 204398994 U | 6/2015 |
| FR | 2958769 A1 | 10/2011 |

OTHER PUBLICATIONS

Brooker, Graham et al (2007). Millimetre Wave 3D Imaging for Industrial Applications. AusWireless 2007 Second International Conference on Wireless Broadband and Ultra Wideband Communications, Sydney: (IEEE) Institute of Electrical and Electronics Engineers.

Maddern, Will et al (2015). Leveraging Experience for Large-scale LIDAR Localization in Changing Cities, 2015 IEEE International Conference on Robotics and Automation, Seattle: (IEEE) Institute of Electrical and Electronics Engineers, pp. 1684-1691.

Christian Wolff, Radar Tutorial: Radar Basics, http://www.radartutorial.eu/01.basics/!rb02.en.html.

* cited by examiner

OBJECT DETECTION USING RADAR AND MACHINE LEARNING

This application claims the benefit of priority to U.S. Provisional Patent Application No. 62/326,564, filed Apr. 22, 2016 entitled "Object Detection Using Radar and Machine Learning" which is hereby incorporated by reference in its entirety into the Detailed Description of Example Embodiments herein below.

FIELD

At least some example embodiments relate to object detection using radar and improvement of radar based object detection through machine learning.

BACKGROUND

Vision systems use visible light to image objects, are cheaper than LIDAR systems and can provide color information about an environment.

A combination of LIDAR and vision may be used to enhance the capabilities of three dimensional object detection. However, existing limitations of each of LIDAR and vision systems, including vulnerability to weather conditions for example, persist.

Additional difficulties with existing systems may be appreciated in view of the Detailed Description of Example Embodiments, below.

SUMMARY

A method and system for using one or more radar systems for object detection in an environment, based on machine learning, is disclosed. A scanning radar or combination of radars mounted on a vehicle or moving object scans the environment to acquire information. The radar data may be a 3D point cloud, 2D radar image or 3D radar image. The radar data may also be combined with data from LIDAR, vision or both. A machine learning algorithm is then applied to the acquired data to detect dynamic or static objects within the environment.

According to one example is an object detection learning system for detecting surrounding objects. The system includes a radar system, memory which includes a dataset and a processor in communication with the memory and configured to execute computer instructions stored on the memory. The computer instructions cause the processor to: receive radar data of an environment which was scanned by the radar system, the data being one of a 3D point cloud, or a 2D or 3D radar image, receive further data of the environment which was scanned from one or both of a LIDAR system or a vision system, and apply machine learning. The machine learning includes: performing object detection based on the received radar data and the received further data and the dataset; identifying at least one object feature comprising one of a type, location, distance, orientation, size or speed of an object; and updating the dataset based on a detected object or the identified object feature.

In some configurations, the processor is configured to selecting, for at least some objects, which of the radar data and the further data is most accurate. In some configurations, the processor is configured to select which of the radar data and the further data is most accurate based on sensed weather conditions or ambient light level. In some configurations the processor is configured to apply machine learning by referencing a training dataset that has been defined in respect of one or both of LIDAR data and image data to associate objects with the radar data. In some embodiments the processor is operable to identify the object feature using a predetermined feature within the dataset of environmental features by comparing an observed feature of the received radar data with said predetermined feature.

Some example embodiments provide a method for processing objects in an environment, comprising: receiving radar data of an environment which was scanned by the radar system wherein the radar data is one of a 3D point cloud, a 2D or 3D radar image, receiving further data of the environment that has been acquired from one or both of a LIDAR system or a vision system, applying machine learning to the received radar data, the machine learning including performing object detection based on the received radar data and a dataset; identifying at least one object feature comprising one of a type, location, distance, orientation, size or speed of an object; and updating the dataset based on a detected object or the identified object feature.

In some configurations, further data about the environment may be acquired from one or both of a LIDAR system or a vision system and the machine learning may be applied based on both the radar data and the further data. In some configurations, the detected object or object feature may be extracted and stored in memory or sent to a remote device.

BRIEF DESCRIPTION OF THE DRAWINGS

Embodiments will now be described by way of examples with reference to the accompanying drawings, in which like reference numerals may be used to indicate similar features, and in which.

DETAILED DESCRIPTION OF EXAMPLE EMBODIMENTS

LIDAR and vision based systems can be used to generate data which may be used for object detection. However, LIDAR systems have some limitations. For example, they are vulnerable to weather conditions. In addition, the wavelengths used in LIDAR systems are often not long enough to penetrate environmental contaminants such as dust and are attenuated by adverse weather conditions such as snow and fog. In addition, LIDAR system performance may be degraded if there is dirt, mud or some other physical contaminant on the LIDAR sensor. Accordingly, systems based on LIDAR exhibit poor performance in adverse weather conditions and LIDAR is therefore not a reliable sensor for object detection in all conditions.

Vision systems can possess the same weaknesses as LIDAR in addition to being less accurate and being vulnerable to poor lighting conditions in the scanning environment. As a result, one challenge with environment sensing and object detection is the need for a high resolution method of mapping an environment that can be deployed in various weather conditions and which is not susceptible to contamination of the sensor.

Furthermore, for example, sensors like LIDAR and vision based sensors can be based on light reflection. Therefore they need to have clear line of sight and are often therefore mounted externally on a sensing vehicle. This clear line of sight can be impeded by mud or dirt that can accumulate on the externally mounted sensors.

Example embodiments are described herein in which machine learning is applied to radar data in order to improve the ability of a detection system to detect various objects and object features such as one or more of object type, distance, orientation, size, speed or any combination of these features. The radar data can be a 3D point cloud or a 2D or 3D radar image, and polarimetric radar and/or interferometry radar and/or Scanning Aperture Radar (SAR) imaging techniques or any other radar techniques and technologies can be used to produce radar data.

In example embodiments, radar data can be combined with the data from LIDAR and/or vision sensor systems and machine learning applied to the combined data in order to improve detection. In some applications, the use of data from multiple sensor types allows the strength of each sensor to be combined with other sensors and more reliable and accurate details and features can be derived. For example, in some applications LIDAR can provide better range estimation and more accurate cloud points compared to radar and vision systems. On the other hand, a vision system can provide color information and more features while radar can provide data robust to a variety of weather conditions and it is less susceptible to interfering elements such as dust in the air and mud and dirt on the sensor.

Radar systems use radio waves to determine the range, angle, velocity, and material type of objects or environment. Radar systems are often composed of a transmitter that emits radio waves (radar signals) in specified directions. When these come into contact with an object, some are reflected or scattered in many directions, and some are reflected back towards the transmitter. The radar system also includes a receiver that may be in the same location as the transmitter, and which captures the radar signals reflected by the environment. Radar systems may also include signal processors which may include digital signal processors for recovering useful radar signals or to interpret the received radar signals.

Radio waves are only weakly absorbed by the media through which they pass and therefore radar can be used to detect objects at relatively long ranges—ranges at which some other electromagnetic wavelengths are too strongly attenuated. In addition, such weather phenomena as fog, clouds, rain, falling snow, and sleet that block visible light are usually transparent to radio waves and accordingly radar can operate in adverse weather conditions. Furthermore, radio wave systems are more reliable than ambient visual systems, where lighting conditions can prove unreliable. Additionally, the characteristics of reflected radio waves may in some applications be processed to provide information on the reflecting material—for example, in at least some conditions, glass, metal, concrete and wood may all provide reflected radio waves having unique characteristics that allow the compositions of different reflecting surfaces to be estimated.

Example embodiments are directed to a system for and method of object detection using radar and machine learning. In some embodiments radar data can be augmented with data acquired from one or both of LIDAR systems and vision systems to perform object detection using machine learning.

Figure 1:
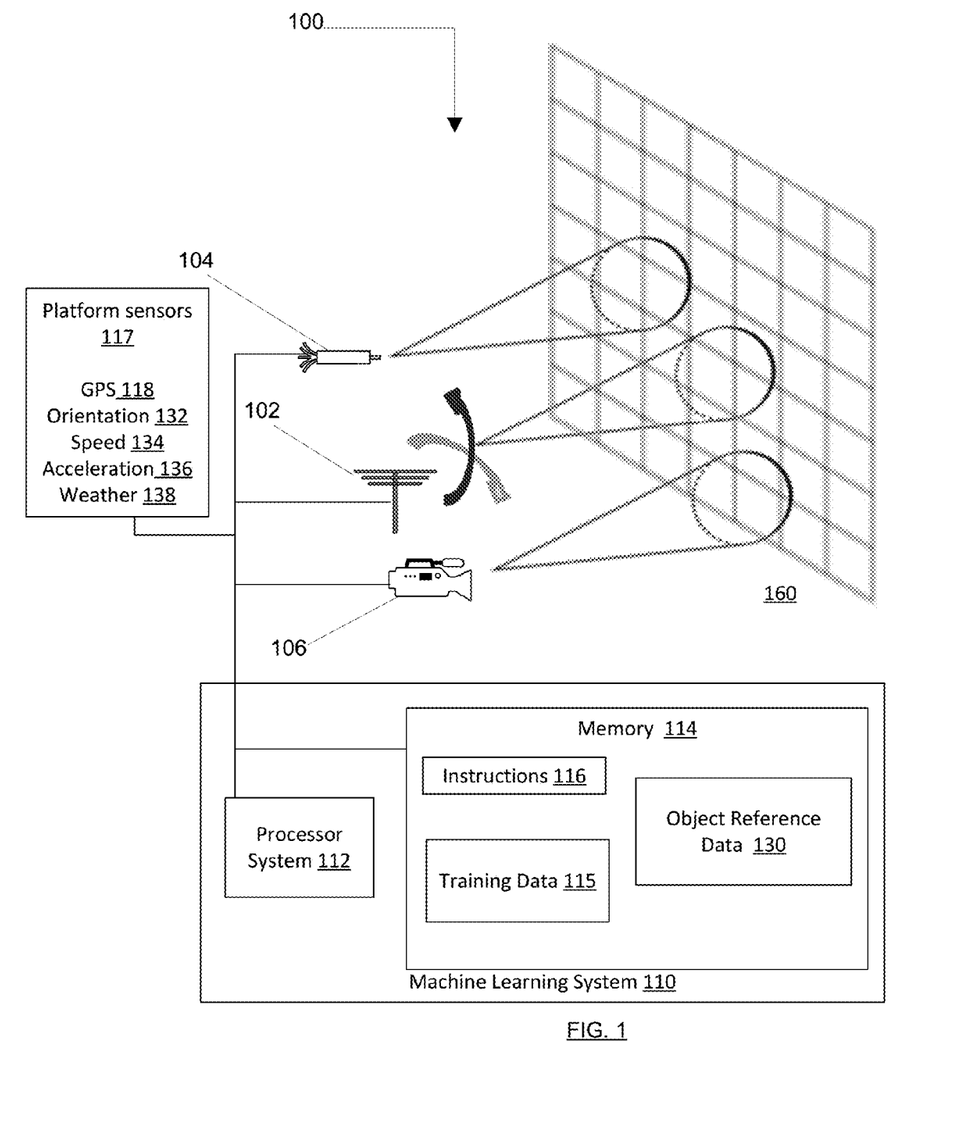
FIG. 1 is a diagrammatic view of an example unified mapping system, in accordance with an example embodiment.

In this regard, FIG. 1 illustrates an example embodiment of an object detection training system 100 that can be used to build an object reference dataset 130, which can be stored in a database or other logical constructs. Object reference dataset 130 identifies a plurality of different object types and sets of characteristics or attributes associated with the objects. The objects are each associated in the dataset with a set of data characteristics such that sensed data patterns can be used to identify the objects and object attributes. In some embodiments, an intended application of the resulting object reference dataset 130 is to provide reference data to allow an automated mapping system to be able to identify objects within an environment accurately and quickly based on sensed data; in some embodiments, such sensed data may be sensed by a radar system on its own, and in some embodiments such sensed data may be sensed by a radar system in combination with one or more other sensor systems such as a LIDAR system or a vision system. Accordingly the better the data in the object reference dataset 130, the more effective the intended mapping application will be.

In an example embodiment object detection training system 100 includes at least a radar data sensor in the form of radar system 102, and may include one or more other data sensors, and a machine learning system 110. In the illustrated embodiments, data sensors include a radar system 102, a LIDAR system 104 and a vision system 106 that can each respectively generate radar data, LIDAR data and image data as digital data for use by machine learning system 110. In one example, the system 100 also includes a plurality of platform sensors 117 for real-time sensing of the location, position and movement of the platform (for example a motor vehicle) that supports the radar system 102, LIDAR system 104 and vision system 106. The platform sensors 117 could include a high accuracy satellite positional system 118 (such as a GPS system) that can provide localization data to system 110, orientation sensors 132 for recording platform yaw, pitch and roll, speed sensor 134, and accelerometer 136. Weather conditions sensors 138 such as temperature, humidity and barometric pressure sensors may also be included with platform sensors 117.

Machine learning system 110 includes a digital processor 112 that may include one or more digital processing units. Learning system 110 also includes memory 114 that has one or more transient and non-transient digital memory storage elements. Computer executable instructions 116 are stored in the memory 114 that configures the processor 112 and machine learning system 110 to perform the functions described in this document.

In at least some example embodiments, a training dataset 115 is also stored in memory 114. Training dataset 115 includes a base set of data that the machine learning system 110 can build on and refine to create and update object reference dataset 130. In some embodiments, the training dataset 115 may be augmented with data obtained from one or more of LIDAR or vision systems to improve object detection.

Figure 2:
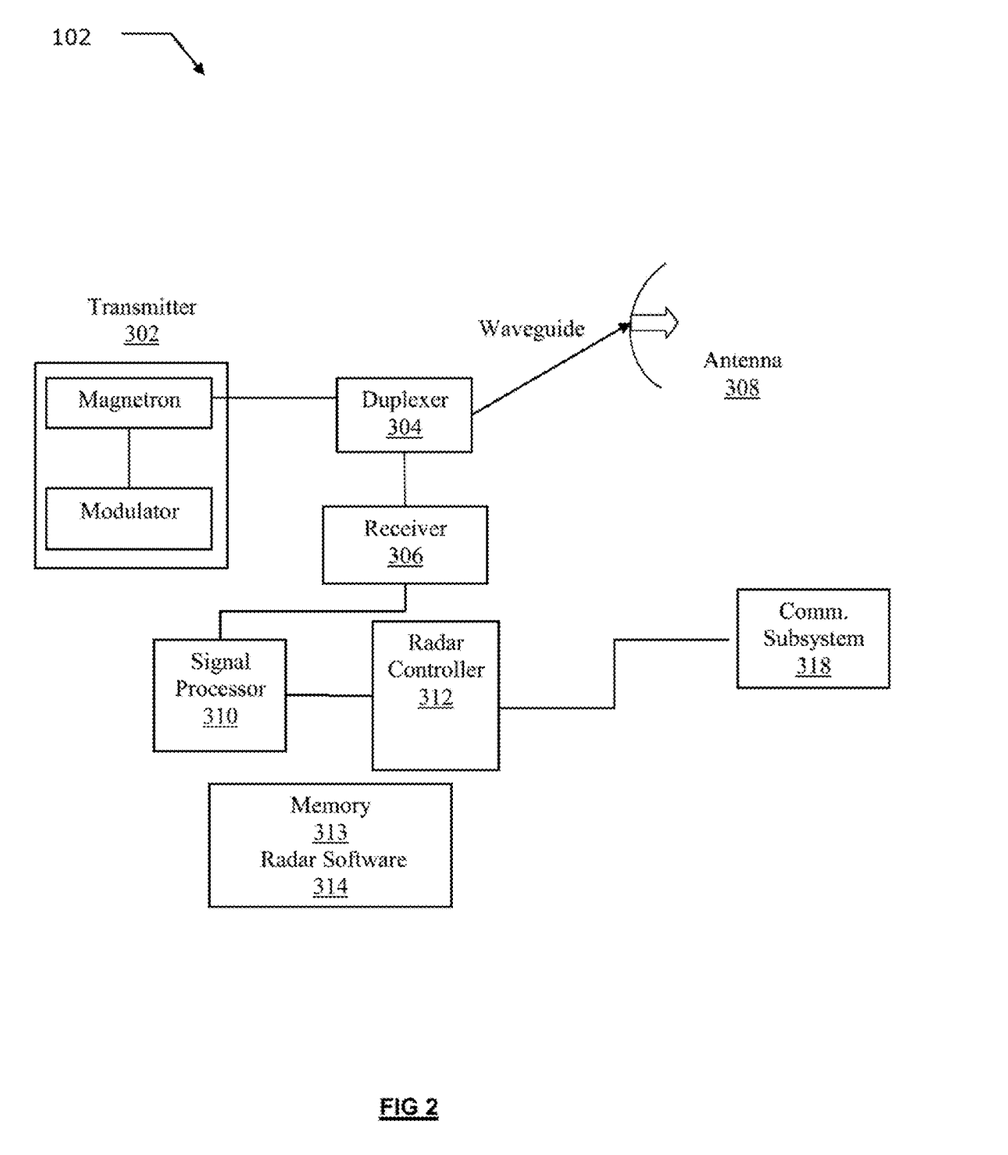
FIG. 2 is a block diagrammatic view of an example radar system, in accordance with an example embodiment.

FIG. 2 shows a block diagrammatic view of an example radar system 102. The radar system 102 includes at least one transmitter 302, at least one duplexer 304, at least one receiver 306, and at least one antenna 308. The antenna 308 may be rotated to direct the transmission of the radar signals and to facilitate the capture of reflected radar signals. The antenna 308 may be electrically steered, for example using phase shifting or frequency shifting, as is understood in the art. The antenna 308 can be directed so as to control the transmission of the radar signals and to facilitate the capture of reflected radar signals. The antenna 308 can be a dipole antenna and/or a grid-based antenna, for example, depending on the particular application. The duplexer 304 is used to alternate the antenna 308 between the transmitter 302 and the receiver 306, so that the same antenna 308 can be used for both transmit and receive functions. The antenna 308 is electrically or conductively connected to the transmitter 302 and the receiver 306. In some other example embodiments, a different antenna 308 is used for transmitting than for receiving.

The radar system 102 uses the radar transmitter 302 which controls the emitted radio signals in order to scan the surrounding environment 160 for example, and uses the receiver 306 to receive the reflections from the environment 160. The radar system 102 is configured, in example embodiments, to scan environment 160 in various directions, along azimuth angles at one or more fixed elevation angles, or in a vertical plane at one or more fixed azimuth angles. The radar scanning may be performed using solely electrical beam steering, or may use a combination of electrical beam steering and mechanical steering. For example, the system 102 can perform electrical beam scanning for varying elevation angles which can be used to achieve a lighter and smaller device compared to mechanical scanning radar devices, and mechanical scanning for varying azimuth angles, or vice versa. In an example embodiment, the radar system 102 can use an ultra wide band (UWB) radar that scans the environment in either plane using a beam with a narrow beam width to increase range resolution and reduce noise. The frequency and wavelengths of the radar system may be varied depending on the application. Further, multiple wavelengths can be used in order to gain additional information.

In example embodiments, the radar system 102 includes a signal processor 310 which processes signals received from the receiver 306. The system 300 further includes a radar controller 312 which is operably connected and in communication with the components of the system 102 and which may use radar software 314 (stored on memory 313 of the system 102) to further process the signals received by the radar system 102 or to perform a radar scan. The signals may be used for generating 2D or 3D maps and for control or response by other subsystems for example. The data received by the receiver 306 is processed by a signal processor 310 based on commands received from the controller 312. The controller 312 can include at least one processor (such as a microprocessor or other digital signal processor) which controls the overall operation of the radar system 300. The controller 312 may interact with the subsystems of the object on or in which it is mounted such as input subsystems, output subsystems, electrical subsystems and electro-mechanical subsystems which may already be part of the object. Various forms of software may be used to send or execute commands including to perform a radar scan.

The radar controller 312 may have access to memory 313 which can store instructions and programs for operation of the controller 312. The controller 312 can be configured to receive and send communications to internal or external devices (including machine learning system 110) by way of one or more communication subsystems 318. The controller 312 may include at least one data recording process for storing in memory 313 signals, data or images captured from the receiver 306 and processed by the controller 312. The radar data can be processed to generate, for example, a two or three dimensional point cloud of the environment or a radar image of the environment, which can be stored to memory 313 or sent to other devices (including machine learning system 110). Multiple scans of the environment may be conducted to gather increased environmental detail and to generate a unified map with more environmental features. The radar system 102 may also use polarimetric radars which can provide more features of the environment to be included in the three dimensional map of the environment. Further, Synthetic Aperture Radar (SAR) imaging, multispectral emission, and interferometry radar techniques can further be used to facilitate object detection. In addition, other radar techniques or configurations may be used to produce radar data including using radar transmitters/receivers where the radio waves are emitted sideward to the direction of travel of a moving object on which the radar system is mounted (side-looking radar), radar systems wherein the radio waves are emitted in the same direction as the direction of travel or any combination of techniques used to produce radar data.

In example embodiments, LIDAR system 104 is configured to scan the azimuth and elevation and may include dual oscillating plane mirrors, polygon mirrors, a laser scanner, or any combination of them. The LIDAR system 104 may use a hole mirror or beam splitter to collect a return signal.

Vision system 106 is configured to take multispectral images of an environment using a charge coupled device (CCD) sensor or a Complementary Metal Oxide Semiconductor (CMOS) sensor. The sensor may be embedded in a digital camera, thermal imaging camera, night vision camera, or other vision systems known in the art. The vision system may also include additional color image sensors, a multispectral imaging camera, illuminator, or any combination known in the art.

In at least some example embodiments, radar data, LIDAR data and camera data is stamped with or otherwise associated with location, positional and movement data from platform sensors 117. In some embodiments, each of the systems 102, 104 and 106 have one or more locational/positional sensors similar to those from the suite of platform sensors 117 integrated within such systems such that locational/positional data is associated with the radar, LIDAR and image data in the processors of the respective systems 102, 104, 106.

In example embodiments, the radar and LIDAR systems 102, 104 include multiple transmitters and receivers, and vision system 106 has multiple camera sensors, for scanning multiple directions within environment 160 concurrently. Reference to scanning in any horizontal plane includes scanning along azimuth angles at a fixed elevation angle. Scanning in the vertical planes includes scanning along elevation angles at one or more fixed azimuth angles.

An example of the operation of the object detection training system, 100 to produce object reference dataset 130 will now be described with respect to FIG. 3. In one example embodiment, at least the sensors (radar system 102, LIDAR system 104, and vision system 106) of the object detection training system 100 are mounted in a ground-based moving vehicle and used to collect information about the environment 160 that surrounds the vehicle. In example embodiments, the radar system 102, LIDAR systems 104, and/or the vision system 106 are not necessarily permanently mounted to the vehicle, and in some example embodiments may be mounted or removed from the vehicle as necessary.

The data collected from the systems 102, 104, 106 and platforms sensors 117 is used to create or update the object reference dataset 130 using machine learning techniques. In one example object reference dataset 130 is created or updated for subsequent use to enable object detection in a vehicle navigation system. In some examples the machine learning system 110 is also included in the vehicle and processes data in real time as the data is collected. In other example embodiments the machine learning system 110 performs all or some processing tasks on data that has been previously collected.

Figure 3:
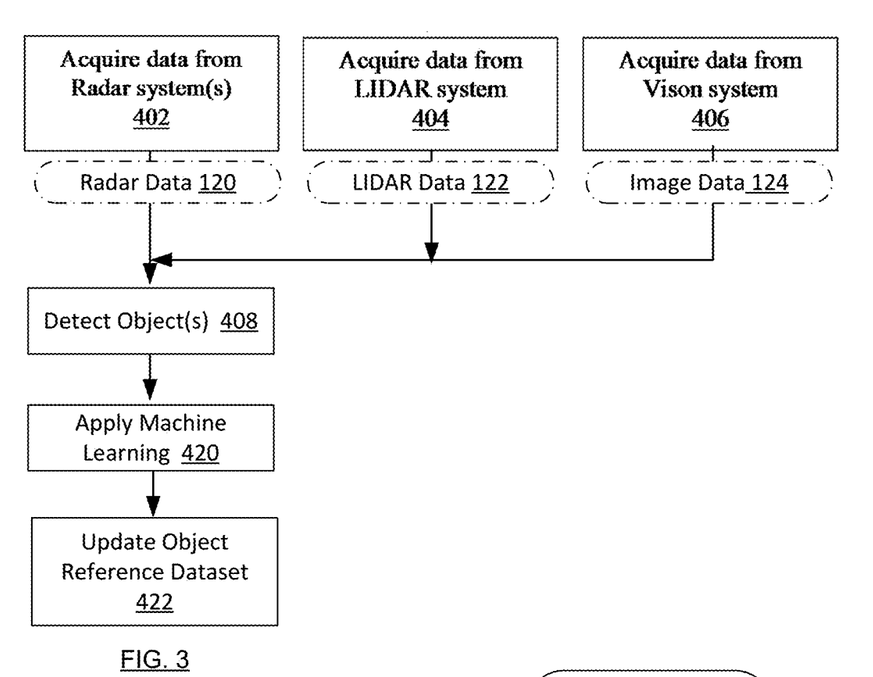
FIG. 3 illustrates a flow diagram for a method of operation of an object detection system using radar and machine learning, in accordance with an example embodiment.

As shown in FIG. 3, the learning process performed by system 100 begins with the acquisition of radar data from the radar system (action 402), LIDAR data from the LIDAR system (action 404), and image data from the vision system (action 406). In some example embodiments, the environmental data is sensed simultaneously by all three systems 102, 104, 106 and provided to the machine learning system 110. However, in at least some examples, some data may be pre-existing data that was gathered at a previous times—for example, in one embodiment, radar data gathered directly from radar system 102 may be combined with one or both of LIDAR data and vision data obtained by machine learning system 110 from an indirect data source such as a commercial data repository rather than directly from LIDAR system 104 or vision system 106.

In one example embodiment, radar data 120 (and in some embodiments LIDAR data 122 and Image data 124) obtained by scanning the environment is processed to detect a possible object in the environment (action 408). The objects may be static or dynamic and can include pedestrians, vehicles, trees, traffic lights, traffic signs, curbs, lane barriers, bridge support, buildings and the like. Once a possible object is detected, machine learning (action 420) is applied to correlate the sensed possible object data to a specific object and a set of object attributes (for example object type, distance, orientation, size, shape, and speed). Once an object is identified and assigned a set of attributes, the object reference dataset is updated (action 422) such that similar objects with similar attributes can be quickly identified in future based on sensed data. Initially, training dataset 115 provides a base set of object identification and attribute data for use during machine learning action 420 and is integrated into object reference dataset 130, and in subsequent learning iterations the object reference dataset 130 functions as the training dataset. Various methods of machine learning known in the art may be applied in action 420 to the radar data 120 including one or more of convex optimization, kernel-based methods, support vector machines, Bayesian learning, deep learning, or other techniques known in the art.

Figure 4:
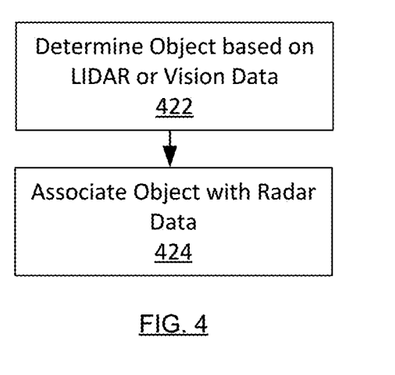
FIG. 4 illustrates a flow diagram of a data source conflict resolution procedure conducted by the mapping system of FIG. 1 in example embodiments.

In some examples, the training dataset 115 is based on previously generated data from one or both of a LIDAR and Vision system 104, 106. In such embodiments machine learning includes, as indicated in FIG. 4, identifying and assigning attributes to a detected object by comparing the data in the training dataset 115 with data derived from the LIDAR data 122 and/or image data 124 (action 422). The object can then be associated with radar data 120 that correlates to the same object or area in the environment as the LIDAR data 122 and/or image data 124 (action 424). Object reference dataset 130 can then be updated to include data that associates the detected object and its attributes to the corresponding radar data 120. Such an embodiment can allow the system, 100 to be used to build an object reference dataset 130 for radar data based on pre-existing LIDAR and/or image object reference datasets.

In some example embodiments, the machine learning is applied solely to the radar data acquired from radar system 102 at step 402. Data acquired from LIDAR system 104 at step 404 and data acquired from Vision system 106 at step 406 may be used to augment the object reference dataset 130 and to improve the training dataset 115. The LIDAR and image data may contain a training dataset that has been defined in respect of one or both of LIDAR data and image data and which may subsequently be used to associate objects with radar data. The machine learning system may then more accurately identify objects detected by the radar system based on the LIDAR and image data.

In another example embodiment, machine learning is applied solely to the radar data. For example where the LIDAR data and image data are obtained from a pre-existing LIDAR and/or image object reference dataset, LIDAR data 122 and image data 124 may be used to augment the object detection of system 100 without being combined with radar data 120. Further, LIDAR data and image data may be accessed independently of radar data 120 without being used to augment the object reference dataset 130 or to improve the training dataset 115 used for object detection. In this embodiment, machine learning and updating of the object reference dataset 130 is based solely on acquired radar data 120 from radar system 102.

Figure 5:
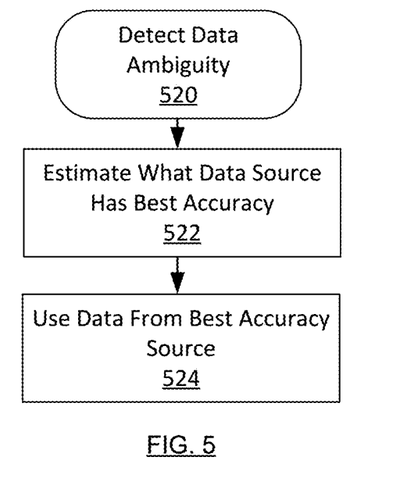
FIG. 5 illustrates a flow diagram of a data ambiguity resolution procedure conducted by the mapping system of FIG. 1 in example embodiments.

In some examples, data from the radar system 102 and one or both of the LIDAR system 104 and vision system 106 can be used to corroborate the data from other systems and resolve ambiguities. In this regard, FIG. 5 illustrates ambiguity resolution process that could be applied as part of actions 408 or 420. Referring to FIG. 5, the processor 112 can be configured to determine when the data from one or more sources for a subject object or region in the environment falls below a predetermined ambiguity threshold (action 520). Such a threshold could for example be based on characteristics of the radar data, or by comparing the radar data to one or more of the LIDAR and image or other datasets. Upon detecting an ambiguity, the processor 112 can, in at least some embodiments, estimate which data source(s) is likely to have the most accurate data (action 522). In an example embodiment the data sources may have pre-assigned accuracy rankings or weightings; for example, under normal operating conditions, LIDAR data 122 is considered most accurate, followed by image data 124 followed by radar data 120.

In this regard, processor 112 is configured to examine data collected from one or more of the environment sensing systems 102, 104, 106 and platform sensors 117 to determine environmental conditions that may affect the predetermined accuracy ratings. For example, temperature data from a temperature sensor on platform sensor 117 and image data from vision system 106 may indicate that at the time of the data conflict a snow storm was occurring. As LIDAR systems and vision systems tend to be more adversely affected by snow compared to Radar systems, the accuracy rankings of the datasets may be reordered for the particular data conflict at hand to give a higher weighting to the radar dataset, then the other two datasets. A determination as to the "best accuracy" data may also be done at the object attribute level—for example LIDAR data may be best suited for distance and shape attribute information, image data for object color attribute data and radar for object material attribute data. The selected "best accuracy" data is then used for object detection or machine learning actions 408 or 420 (action 524) and thus incorporated into the object reference dataset 130

The accuracy ranking/estimation performed at action 522 can be configured to evaluate multiple conditions as sensed by the sensors, including: various weather conditions (rain, snow, fog, humidity, temperature, air pressure); platform vehicle speed, acceleration, movement; ambient light level (LIDAR and vision systems can have reduced accuracy at night); quality assessment of data in the datasets; distance of the subject object from the platform vehicle, etc. As noted above, in some examples, the LIDAR data may be assumed to be the most accurate unless sensed conditions indicate otherwise.

In addition to generated object reference dataset 130, in example embodiments the system 100 can be applied to a vehicle to enable the vehicle to use the object reference dataset 130 for recognizing and detecting objects, for example in an autonomous vehicle application. In one example embodiment, a vehicle receives real-time data (which may for example include information about distance, orientation, size, shape, and speed of a detected object) from radar system 102 (and in some embodiments, LIDAR and or vision systems 104, 106) and compares that sensed data against pattern information in object reference dataset 130 to identify the object and determine further attributes for the object. In some embodiments, the system can continue to apply machine learning to continually update the object reference dataset.

In some embodiments, a machine learning enabled system may allow an object detection system that requires only a radar system. In some embodiments, the accuracy of the system can be improved by combining data from the different sources using methods such as those described above. In some embodiments, the processor 112 is configured to extract detected objects and object features which may be stored in memory or sent to a remote device such as a server. The extracted objects or object features may be used to update the object reference dataset 130 or may be used as input for a localization or other system.

In some embodiments, the processor 112 is configured to recognize one or more object features within the dataset of environmental features by performing a one-to-one comparison between an observed feature of the received radar data and a predetermined feature to recognize and identify the predetermined feature within the received radar data. In some example embodiments, the predetermined feature of the environment may be the dimension, size, and/or color of a road sign in the environment, such as a stop sign or speed limit sign. The processor 112 may readily compare the received radar data to the predetermined feature to recognize and identify object features of the environmental road sign within the received radar data to make more exact identifications.

In the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. An object detection system, comprising:
   memory which includes a dataset; and
   a processor configured to execute computer instructions stored on the memory, the computer instructions causing the processor to:
      receive radar data of an environment which was scanned by a radar system of a vehicle operating in the environment, wherein the radar data is one of a 3D point cloud, a 2D radar image or a 3D radar image,
      perform object detection, using a machine learning system, to detect at least one object and identify at least one object feature associated with the detected object based on the input, wherein the machine learning system is trained based on the dataset;
      receive further data of the environment which was scanned from one or both of a LIDAR system or a vision system of the vehicle when operating in the environment,
      perform object detection, using the machine learning system, to detect at least one object and to identify at least one object feature associated with the detected object based on the further data;
      compare the received radar data and the received further data,
      in response to detecting ambiguity between the received radar data and the received further data based on the comparison:
         select which of the received radar data and the received further data has best accuracy, and
         update the dataset to include data associated with the at least one detected object and the identified at least one object feature from the received radar data or the received further data having the best accuracy.

2. The object detection learning system of claim 1 wherein the at least one object feature includes a type of that object, and wherein for said selecting, the received radar data has the best accuracy for the type of that object.

3. The object detection learning system of claim 1 wherein the at least one object feature includes a location of that object, and wherein for said selecting, the received further data has the best accuracy for the location of that object.

4. The object detection learning system of claim 1 wherein the at least one object feature includes a distance to that object, and wherein, for said selecting, the received further data has the best accuracy for the distance to that object.

5. The object detection learning system of claim 1 wherein the at least one object feature includes an orientation of that object, and wherein for said selecting, the received further data has the best accuracy for the orientation of that object.

6. The object detection learning system of claim 1 wherein the at least one object feature includes a size of that object, and wherein for said selecting, the received further data has the best accuracy for the size of that object.

7. The object detection learning system of claim 1 wherein the at least one object feature includes a speed of that object, and wherein for said selecting, the received further data has the best accuracy for the speed of that object.

8. The object detection learning system of claim 1 wherein said selecting, for at least some of the objects, which of the radar data and the further data has the best accuracy is based on sensed weather conditions or ambient light level.

9. The object detection learning system of claim 1 wherein the computer instructions cause the processor to, when no ambiguity is detected based on the comparison, update the dataset using data associated with the detected at least one object and the identified at least one object feature from the received radar data and data associated with the detected at least one object and the identified at least one object feature from the received further data.

10. The object detection learning system of claim 1 wherein the dataset has been defined in respect of one or both of LIDAR data and image data to associate objects with the radar data.

11. The object detection learning system of claim 10 wherein the dataset is comprised of one or more environmental features.

12. The object detection learning system of claim 11 wherein the dataset comprising the one or more environmental features is based from data obtained from at least one of the radar, the LIDAR system and the vision system.

13. The object detection learning system of claim 12, wherein the machine learning system is configured to identify the at least one object feature by comparing an observed feature of the received radar data with a predetermined feature in the dataset.

14. The object detection learning system of claim 1 wherein the machine learning system is configured to extract the detected at least one object or the identified at least one object feature and store said detected at least one object or the identified at least one object feature in the memory or send to a remote device.

15. A method for processing object data representative of an environment, comprising:
receiving radar data of an environment which was scanned by a radar system of a vehicle operating in the environment, wherein the radar data is one of a 3D point cloud, a 2D radar image or a 3D radar image;
receiving further data of the environment which was scanned from one or both of a LIDAR system or a vision system of the vehicle operating in the environment;
performing object detection, using a machine learning system, to detect at least one object and at least one object feature of the detected object based on the further input performing object detection, using a machine learning system, to detect at least one object and at least one object feature of the detected object based on the further data;
comparing the received radar data and the radar data;
in response to detecting ambiguity between the received radar data and the received further data based on comparison:
select which of the received radar data and the received further data has best accuracy; and
update the dataset to include data associated with the at least one detected object and the identified at least one object feature from the received radar data or the received further data having the best accuracy.

16. The method of claim 15 wherein said detecting the conflict comprises selecting, for at least one of the objects, which of the radar data and the further data is most accurate based on sensed weather conditions or ambient level.

17. The method of claim 15 wherein the dataset has been defined in respect of one or both of LIDAR data and image data to associate objects with the radar data.

18. The method of claim 17 wherein the training dataset is comprised of one or more environmental features.

19. The method of claim 15 further comprising when no ambiguity is detected based on the comparison, updating the dataset using data associated with the detected at least one object and the identified at least one object feature from the received radar data and data associated with the detected at least one object and the identified at least one object feature from the received further data.

20. The method of claim 15 further comprising extracting the at least one detected object or the identified at least one object feature and storing said detected at least one object or the identified at least one object feature in memory or sending to a remote device.

* * * * *